United States Patent
Pallath (10) Patent No.: US 10,766,102 B2
(45) Date of Patent: Sep. 8, 2020

(54) METHOD AND SYSTEM FOR PERFORMING LASER MARKING

(71) Applicant: Wipro Limited, Bangalore (IN)

(72) Inventor: Sujith Krishnan Pallath, Kochi (IN)

(73) Assignee: Wipro Limited, Bangalore (IN)

( * ) Notice: Subject to any disclaimer, the term of this patent is extended or adjusted under 35 U.S.C. 154(b) by 341 days.

(21) Appl. No.: 15/860,288

(22) Filed: Jan. 2, 2018

(65) Prior Publication Data

US 2019/0151989 A1 May 23, 2019

(30) Foreign Application Priority Data

Nov. 20, 2017 (IN) .............................. 201741041511

(51) Int. Cl.
| | | |
|---|---|---|
| *B23K 26/08* | (2014.01) | |
| *B23K 26/03* | (2006.01) | |
| *B23K 26/352* | (2014.01) | |
| *B23K 26/36* | (2014.01) | |
| *B41M 5/24* | (2006.01) | |
| *B23K 26/361* | (2014.01) | |
| *B23K 26/362* | (2014.01) | |
| *B41M 5/26* | (2006.01) | |

(52) U.S. Cl.
CPC ........ *B23K 26/0892* (2013.01); *B23K 26/032* (2013.01); *B23K 26/352* (2015.10); *B23K 26/36* (2013.01); *B23K 26/361* (2015.10); *B23K 26/362* (2013.01); *B41M 5/24* (2013.01); *B41M 5/26* (2013.01); *B41M 5/262* (2013.01); *B41M 5/267* (2013.01)

(58) Field of Classification Search
CPC .. B23K 26/032; B23K 26/08; B23K 26/0892; B23K 26/352; B23K 26/36; B23K 26/361; B23K 26/362; B41M 5/24; B41M 5/26; B41M 5/262; B41M 5/267; H01L 23/544

See application file for complete search history.

(56) References Cited

U.S. PATENT DOCUMENTS

| | | | | |
|---|---|---|---|---|
| 9,710,901 | B2 * | 7/2017 | Seo | .......................... A61J 3/007 |
| 10,123,942 | B2 * | 11/2018 | Miyake | ..................... A61J 3/06 |
| 10,312,166 | B2 * | 6/2019 | Suzuki | ................. B23K 26/702 |
| 10,513,400 | B1 * | 12/2019 | Mesropyan | ............... G06T 7/74 |
| 2003/0102292 | A1 * | 6/2003 | Han | .................. H01L 21/67282 |
| | | | | 219/121.78 |
| 2015/0341607 | A1 * | 11/2015 | Kobayashi | ........... H04N 9/3185 |
| | | | | 348/744 |
| 2017/0080733 | A1 | 3/2017 | Song et al. | |
| 2017/0270434 | A1 * | 9/2017 | Takigawa | ............... B23K 26/38 |

OTHER PUBLICATIONS

PDF translation for WO2016/129305.*

* cited by examiner

*Primary Examiner* — Nicholas J. Weiss
(74) *Attorney, Agent, or Firm* — Finnegan, Henderson, Farabow, Garrett & Dunner, LLP (57) ABSTRACT

Embodiments of present disclosure discloses system and method for performing laser marking. Initially, a first image of a region to be laser marked may be captured and compared with a predefined image of a predefined pattern to be laser marked on the region. By the comparison, a first score may be computed. The first score may indicate marking present in the region to be laser marked, in relation to the predefined image. Further, a co-ordinate data of a configuration file, relating to the predefined pattern, in the laser marking system may be modified based on the first score, for performing the laser marking on the region.

11 Claims, 10 Drawing Sheets

METHOD AND SYSTEM FOR PERFORMING LASER MARKING

This application claims the benefit of Indian Patent Application Ser. No. 201741041511 filed Nov. 20, 2017, which is hereby incorporated by reference in its entirety.

TECHNICAL FIELD

The present subject matter is related in general to the field of laser marking technology, more particularly, but not exclusively to a system and method for performing laser marking by modifying configuration file used for the laser marking.

BACKGROUND

Laser marking is a technique of marking a predefined pattern on a material. The laser marking may also be referred as a laser engraving, where, the material is exposed to a laser rays to engrave the predefined pattern on the material.

In existing laser marking techniques, one or more materials may be laser marked using conventional laser marking unit. In scenarios where a material already comprises a marking of the predefined pattern, laser marking on such material may give rise to over marking on the material. Over marking on the material may not be desirable, since it would result in defective materials and wastage of materials. In such scenarios, the over marking may be eliminated by monitoring the material which is to be laser marked. The existing laser marking techniques may disclose to monitor the material before laser marking, and perform one of rejecting and accepting the material for laser marking based on the monitoring. In some scenarios, a part of the predefined pattern may be present on the material. The existing laser marking techniques, by monitoring, may reject the material assuming the marking on the material to be irrelevant instead of marking the material with part of the predefined pattern which is not present on the material. This may result in incorrectly detecting the material to be defective material. Also, wastage of the materials may increase by the incorrect detection. The existing laser marking techniques do not disclose to understand pattern of the marking present on the material and perform the laser marking based on the pattern.

Further, upon laser marking, it may be essential to check if the laser marking performed on the material is valid or invalid. Presently, a user may measure the laser marking on the region and may compare with the predefined pattern to validate the laser marking. Manual measuring and comparison of the laser marked region may be complex and tedious. Also, such validation may not be accurate and reliable.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for performing laser marking. Initially, a first image of a region to be laser marked may be captured and compared with a predefined image of a predefined pattern to be laser marked on the region. By the comparison, a first score may be computed. The first score may indicate marking present in the region to be laser marked, in relation to the predefined image. Further, a co-ordinate data of a configuration file, relating to the predefined pattern, in the laser marking system may be modified based on the first score, for performing the laser marking on the region.

In an embodiment, the present disclosure relates to a laser marking system for performing laser marking. The laser marking monitoring system includes a processor and a memory, and the memory is communicatively coupled to the processor. The memory stores processor-executable instructions which on execution cause the processor to perform the laser marking. Initially, a first image of a region to be laser marked may be captured and compared with a predefined image of a predefined pattern to be laser marked on the region. By the comparison, a first score may be computed. The first score may indicate marking present in the region to be laser marked, in relation to the predefined image. Further, a co-ordinate data of a configuration file, relating to the predefined pattern, in the laser marking system may be modified based on the first score, for performing the laser marking on the region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Pre-inspection of a material which is to be laser marked may be essential to eliminate over marking on the material. By the pre-inspection, wastage of the material may also be avoided. Further, upon performing a laser marking based on the pre-inspection, post-inspection of the material which is laser marked may also be essential to validate the laser marking on the material. By the post-inspection, accuracy relating to the laser marking may be determined and thereby, optimization of the laser marking may be performed to achieve greater accuracy. The present disclosure discloses a laser marking system configured to perform the pre-inspection and the post-inspection of the laser marking. The laser marking of the present disclosure implements a machine learning technique which may be used for the post-inspection. An automated system for complete process of the laser marking may be provisioned in the present disclosure.

Figure 1:
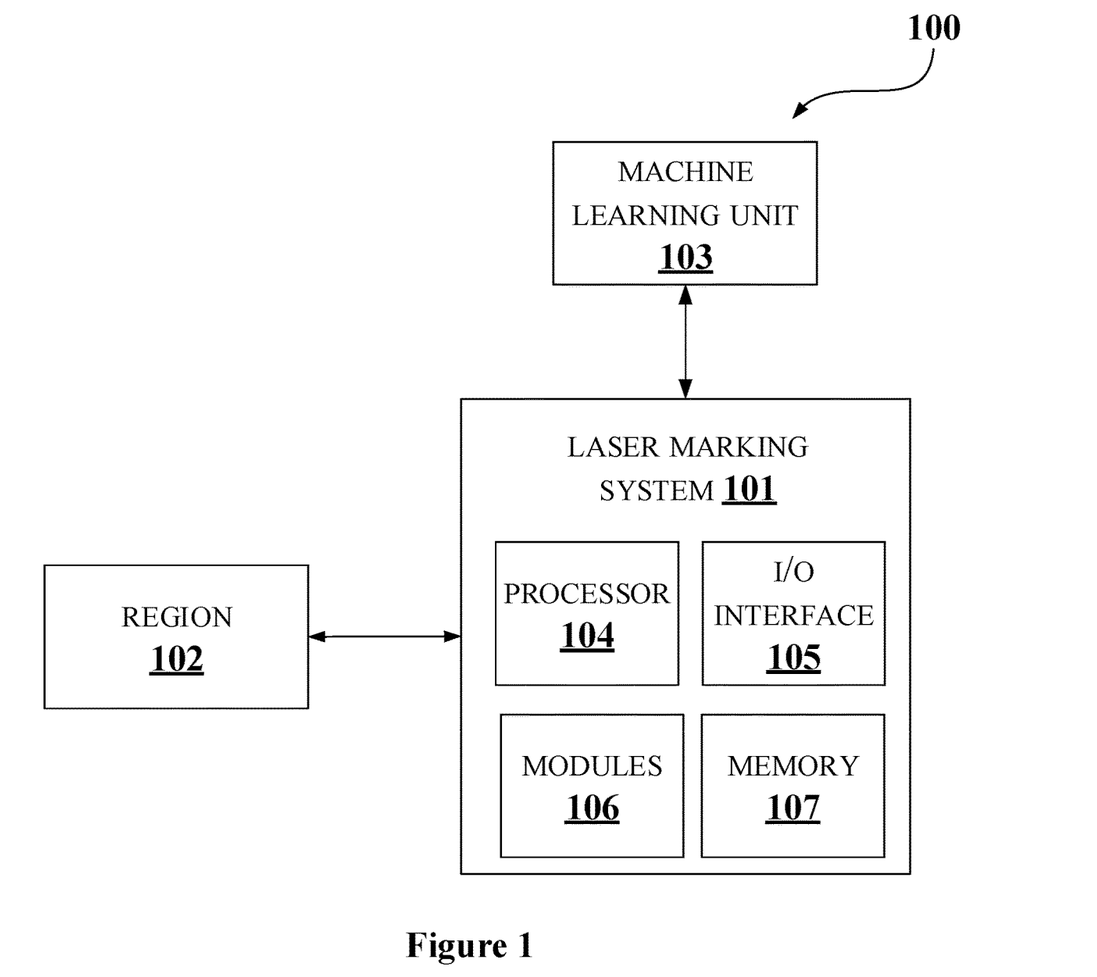
FIG. 1 illustrates an exemplary environment for performing laser marking in accordance with some embodiments of the present disclosure.

FIG. 1 illustrates an exemplary environment 100 of a laser marking system 101 for performing laser marking. The exemplary environment 100 comprises the laser marking system 101, a region 102 in a material to be laser marked and a machine learning unit 103. The laser marking system 101 may be configured to perform the laser marking as disclosed in the present disclosure. The material to be laser marked may be placed in relation with the laser marking system 101, such that, the laser marking system 101 is enabled to perform the steps as indicated in the present disclosure. The machine learning unit 103 may communicate with the laser marking system 101 via a communication network (not shown in the figure). The laser marking system 101 may communicate with the machine learning unit 103 for retrieving and providing data which may be used for the laser marking. In an embodiment, the machine learning unit 103 may be embedded in the laser marking system 101 for performing laser marking on the region 102. In an embodiment, the communication network 105 may include, without limitation, a direct interconnection, Local Area Network (LAN), Wide Area Network (WAN), wireless network (e.g., using Wireless Application Protocol), the Internet, and the like.

Further, the laser marking system 101 includes a processor 104, an I/O interface 105, one or more modules 106 and a memory 107. In some embodiments, the memory 107 may be communicatively coupled to the processor 104. The memory 107 stores processor executable instructions, which, on execution, may cause the laser marking system 101 to perform the laser marking on the material. The laser marking system 101 may be implemented in a variety of computing systems, such as a laptop computer, a desktop computer, a Personal Computer (PC), a notebook, a smartphone, a tablet, e-book readers, a server, a network server, and the like.

For performing the laser marking on the region 102, initially, a first image of the region 102 to be laser marked on the material is captured. The captured image may be compared with a predefined image to compute a first score. The predefined image may be an image of the predefined pattern that is to be laser marked. In an embodiment, the predefined image may be provided by a user associated with the laser marking system 101. In an embodiment, the predefined image may be calibrated, or a new predefined image may be provided, by the user, based on requirement of the laser marking. The first score indicates marking present in the region 102 to be laser marked, in relation to the predefined image. In an embodiment, the first score may be computed by performing sub-pixel level comparison of the first image and the predefined image. In an embodiment, one or more image processing techniques may be implemented to compare the first image and the predefined image and compute the first score.

In an embodiment, the comparing may include to check the amount of the predefined pattern on the region 102 to be laser marked. For example, the laser marking system 101 may compute the first score to be 0% by comparing the first image and the predefined image, if there is no marking on the region 102. Similarly, the laser marking system 101 may compute the first score to be 50% by comparing the first image and the predefined image, if there is half of the predefined pattern on the region 102. Based on the first score, the laser marking system 101 may modify a co-ordinate data of a configuration file in the laser marking system 101. In an embodiment, the configuration file may be a directory file associated with the laser marking system 101. The configuration file may comprise the co-ordinate data, a first predefined threshold value and a second predefined threshold value associated with the laser marking system 101. In an embodiment, the co-ordinate data may be used for performing the laser marking by the laser marking system 101. In an embodiment, the first threshold value may be used to perform a pre-inspection by the laser marking system 101 and the second threshold value may be used to perform a post-inspection by the laser marking system 101. In an embodiment, the first predefined threshold value may be equal to the second predefined threshold value. The co-ordinate data may be related to the predefined pattern which is to be marked on the region 102. In an embodiment, the modification of the co-ordinate data may be performed to eliminate over marking on the region 102. For example, the co-ordinate data may be modified to mark remaining half of the predefined pattern, if the first score is determined to be 50%. In an embodiment, the co-ordinate data may not be modified, if the first score is determined to be 0%.

In an embodiment, the laser marking system 101 may modify the co-ordinate data by, initially, comparing the first score with the first predefined threshold value of the configuration file. In an embodiment, the configuration file may include the first predefined threshold in a generic format of XML file. Based on the first score and the co-ordinate data, a portion of the region 102 to be laser marked may be determined when the first score is lesser than the first predefined threshold value. In an embodiment, the portion indicates portion of the predefined pattern which may not be present on the region 102. In an embodiment, one or more image processing techniques, known to a person skilled in the art, may be implemented for determining the portion. Upon determining the portion, the co-ordinate data is modified based on the determined portion. The laser marking system 101 may perform the laser marking on the region 102 based on the modified co-ordinate data.

In an embodiment, the laser marking system 101 may be configured to detect the material to be a defective material, based on the first score. For example, the region 102 of the material may comprise an irrelevant marking which is not associated with the predefined pattern. Based on at least one of the first score, the predefined pattern and the co-ordinate data, the laser marking system 101 may determine the material to be the defective material.

In an embodiment of the present disclosure, the laser marking system 101 may be further configured to capture a second image of a laser marked region upon the laser marking. The second image may be compared with the predefined image to compute a second score. The second score indicates amount of marking present in the laser marked region in relation to the predefined image, in an embodiment, one or more image processing techniques, known to a person skilled in the art, may be implemented to compare the second image and the predefined image, and compute the second score. In an embodiment, the second score may be computed by performing sub-pixel level comparison of the second image and the predefined image. The second score computed by the laser marking system 101 may define accuracy associated the laser marking.

In an embodiment, the comparing during the pre-inspection may include to check the amount the predefined pattern on the region 102 to be laser marked. Further, the laser marking system 101 may validate the laser marking, performed on the region 102, based on the second score. The validation comprises determining the laser marking to be one of a valid laser marking and an invalid laser marking. The laser marking system 101 determines the laser marking to be the valid laser marking when the second score is greater than the second predefined threshold value of the configuration file. The laser marking system 101 determines the laser marking to be the invalid laser marking when the second score is lesser than a second predefined threshold value. In an embodiment, the configuration file may include the second predefined threshold value in a generic format in XML file.

Upon determining the laser marking to be the valid laser marking, the second predefined threshold value is updated based on a reference score. In an embodiment, the reference score is determined using the machine learning unit 103, based on second score associated with one or more previous laser marked regions associated with valid laser marking. In an embodiment, the machine learning unit 103 may retrieve the second score of the previous valid laser markings for every valid laser marking determined by the laser marking system 101. The reference score may be an average value of the second scores. In an embodiment, the reference score may be compared with the second predefined threshold value. The laser marking system 101 may determine the reference score to be one of greater than and lesser than the second predefined threshold value. The laser marking system 101 may update the second predefined threshold value based on the reference score. In an embodiment, the second predefined threshold value may be updated with value of the reference score when the reference score is greater than the second predefine threshold value.

In an embodiment, the laser marking system 101 may receive data for performing the laser marking through the I/O interface 105 of the laser marking system 101. Also, the laser marking system 101 may transmit data for performing the laser marking via the I/O interface 105. The I/O interface 105 may be coupled with the processor 104 of the laser marking system 101.

Figure 2:
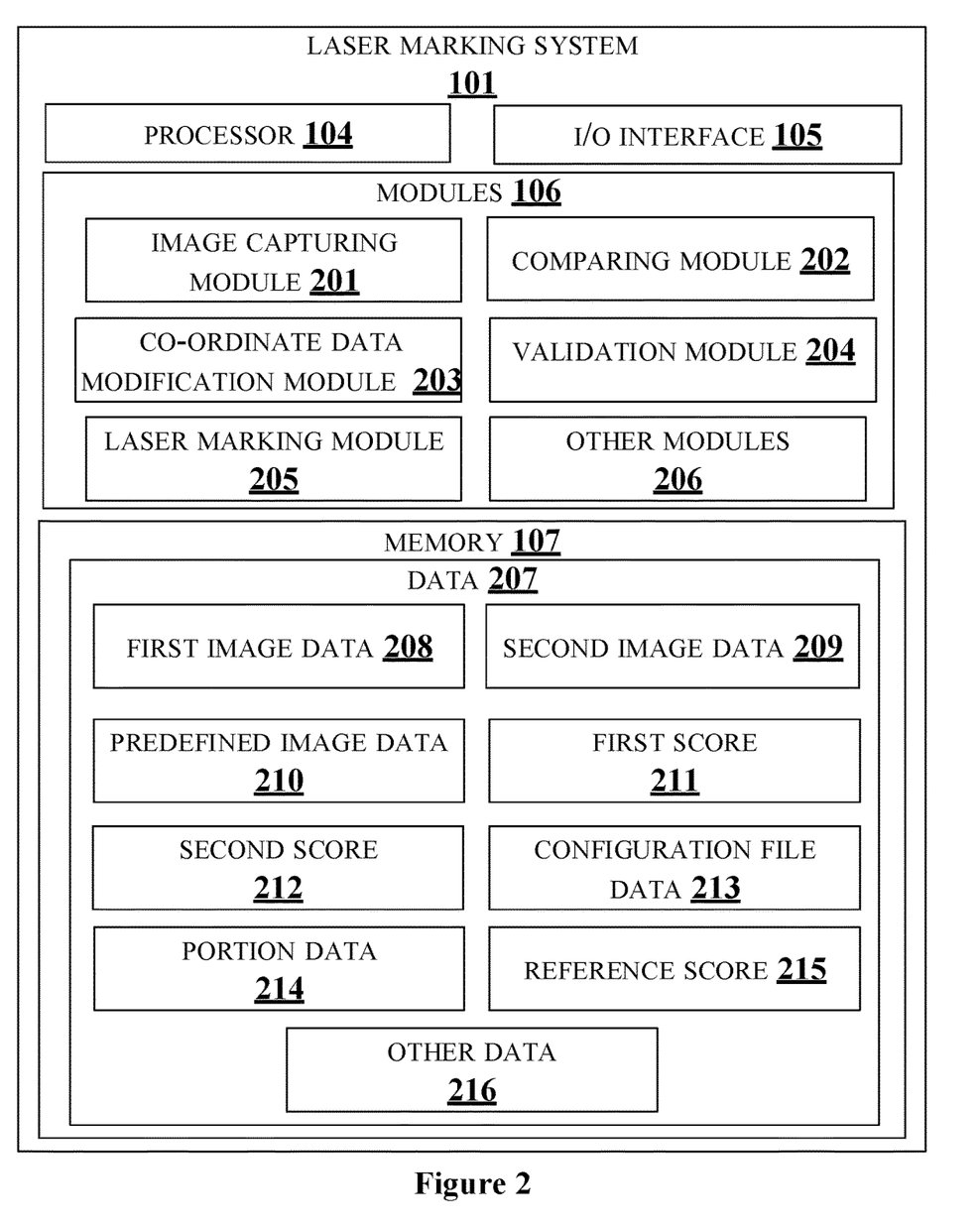
FIG. 2 shows a detailed block diagram of a laser marking system for performing laser marking in accordance with some embodiments of the present disclosure.

FIG. 2 shows a detailed block diagram of the laser marking system 101 for performing the laser marking in accordance with some embodiments of the present disclosure.

The data 209 in the memory 107 and the one or more modules 106 of the laser marking system 101 may be described herein in detail.

In one implementation, the one or more modules 106 may include, but are not limited to, an image capturing module 201, a comparing module 202, a co-ordinate data modification module 203, a validation module 204, a laser marking module 205, and one or more other modules 206, associated with the laser marking system 101.

In an embodiment, the data 207 in the memory 107 may comprise a first image data 208 (also referred as a first image 208), a second image data 209 (also referred as a second image 209), a predefined image data 210 (also referred as a predefined image 210), a first score 211, a second score 212, a configuration file data 213 (also referred as a configuration file 213), a portion data 214 (also referred as a portion 214), a reference score 215 and other data 216 associated with the laser marking system 101.

In an embodiment, the data 207 in the memory 107 may be processed by the one or more modules 106 of the laser marking system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The one or more modules 106 when configured with the functionality defined in the present disclosure may result in a novel hardware.

The laser marking system 101 of the present disclosure may be configured to perform pre-inspection before the laser marking is performed and post-inspection after the laser marking is performed. By the pre-inspection, the laser marking system 101 may detect for any existing markings present on the material to be laser marked and performs the laser marking based on the existing markings. For the pre-inspection, the image capturing module 201 of the laser marking system 101 captures the first image 107 of the region 102 to be laser marked in the material. In an embodiment, the image capturing module 201 may be camera or any device which may be configured to capture an image. In an embodiment, the image capturing module 201 may be configured to detect edges of the material to focus at the location of the region 102 and capture the first image 208 of the region 102. The captured first image 208 may be in any format which may be used by the laser marking system 101 for performing the laser marking.

Figures 5A, 5B:
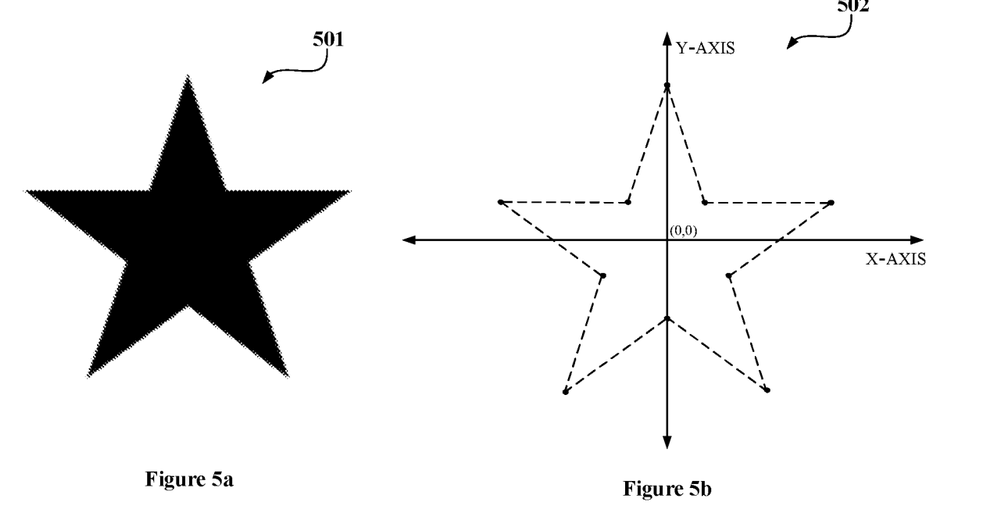
FIG. 5a-5h illustrates exemplary representations of a predefined image, a first image, a second image and a co-ordinate data for monitoring laser marking in accordance with some embodiments of present disclosure.
Figure 5C:
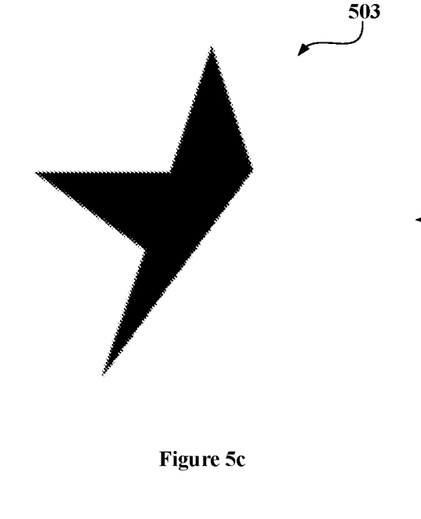
Figure 5D:
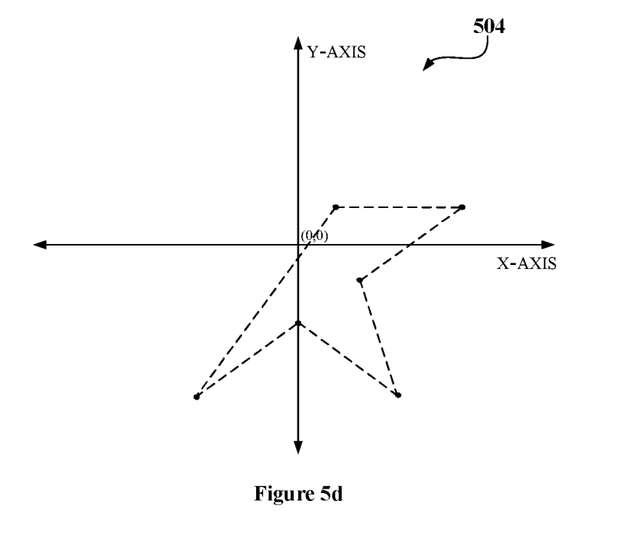
Figure 5E:
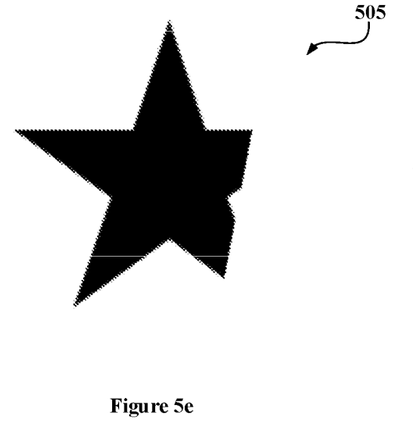

The comparing module 202 of the laser marking system 101 compares the first image 208 with the predefined image 210 to compute the first score 211. FIG. 5*a* illustrates an exemplary representation of the predefined image 501 of the predefined pattern. The predefined image 501 may be an image of the predefine pattern that is to be laser marked on the region 102. The co-ordinate data 502, of the configuration file 213, associated with the predefined pattern in the predefined image 501 may be represented as in FIG. 5*b*. In an embodiment, the co-ordinate data 502 indicates co-ordinates of the predefined pattern, in a 2-dimensional plane. The co-ordinate data 502 may be used by the laser marking system 101 as a reference for performing the laser marking. The laser marking may be based on the co-ordinates indicated in the co-ordinate data 502. Consider the first image 503 captured by the image capturing module 201 may be as illustrated in the FIG. 5*c*. The first image 503 represents the markings present on the region 102 before the laser marking is performed. By comparing the predefined image 501 and the first image 503, by the comparing module 202, the first score 211 is computed. The first score 211 indicates the amount of the predefined pattern present, on the region 102 to be laser marked. For example, by comparing the predefined image 501 and the first image 503, the comparing module 202 may be able to detect that half of the predefined pattern is present on the region 102. Hence, the computed first score 211 may be 50%. Similarly, consider the first image 505 to be as represented in FIG. 5*e*. By comparing the first image 505 with the predefined image 501, the comparing module 202 may be able detect the amount of the predefined pattern present on the region 102. Hence, the comparing module 202 may compute the first score 211 to be 20%. One or more techniques, known to a person skilled in the art may be implemented for comparing the predefined image 210 and the first image 208. Also, one or more techniques, known to a person skilled in the art may be used for computing the first score 211 based on the comparison.

Figure 5F:
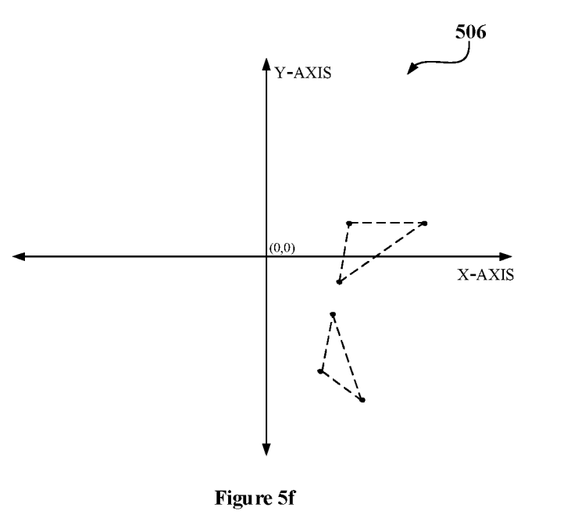

Based on the first score 211, the co-ordinate data modification module 203 of the laser marking system 101 modifies the co-ordinate data 502. In an embodiment, for modifying the co-ordinate data 502, the computed first score 211 may be compared with the first predefined threshold value of the configuration file 213. The co-ordinate data modification module 203 modifies the co-ordinate data 502, when the first score 211 is lesser than the first predefined threshold value. When the first score 211 is greater than the first predefined threshold value, the laser marking system 101 understands that the predefined pattern may already be present on the material and hence the laser marking on the material may be aborted. For example, consider the first score 211 to be 98%, i.e., 98% of the predefined pattern is already present on the region 102, and the first threshold value is 95%. Since, the first score 211 is greater than the first predefined threshold value, the laser marking may not be performed on the region 102. In an embodiment, the laser marking may not be performed when the first score 211 is equal to the first predefined threshold value. For the first image 503, the first score 211 may be computed to be 50%. Since the first score 211 is lesser than the first predefined threshold value, the co-ordinate data modification module 203 may be configured to modify the co-ordinate data 502. In an embodiment, the co-ordinate data modification module 203 may determine the portion 214 of the region 102 that is to be laser marked. In an embodiment, the portion 214 may be the part of the predefined pattern that may be missed out on the region 102. The portion 214 may be determined based on the first score 211 and the co-ordinate data 502. For modifying the co-ordinate data 205, the co-ordinates of the co-ordinate data 502 may be varied. The modified co-ordinate data 504 for the first image 503 may be as illustrated in FIG. 5*d*. Similarly, for the first image 505, the first score 211 may be computed to be 20%. Since the first score 211 is lesser than the first predefined threshold value, the co-ordinate data modification module 203 may be configured modify the co-ordinate data 502. The co-ordinate data modification module 203 may determine the portion 214 i.e., the part of the predefined pattern that may be missed out on the region 102. The portion 214 may be determined based on the first score 211 i.e., 20% and the co-ordinate data 502. The modified co-ordinate data 506 for the first image 505 may be as illustrated in FIG. 5*f*. In an embodiment, the modified co-ordinate may be stored in the configuration file 213 associated with the Laser marking system 101, for performing the laser marking on the material. In an embodiment, the modified co-ordinate data may vary based on the first image 208 of the region 102 to be laser marked.

Upon modifying the co-ordinate data, the laser marking module 205 may be configured to perform the laser marking on the region 102 based on the modified co-ordinate data. The modified co-ordinate data may indicate the co-ordinates based on which the laser marking module 205 performs the laser marking, to engrave the predefined pattern on the region 102. By modifying the co-ordinate data, over marking may be avoided.

Figure 5G:
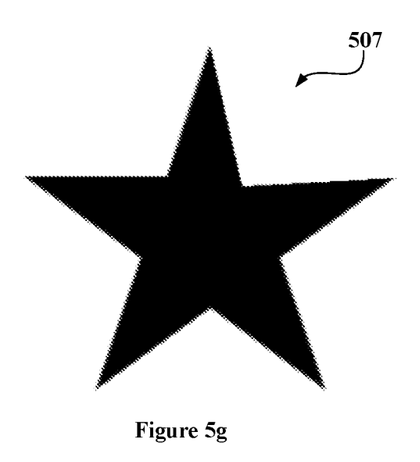
Figure 5H:
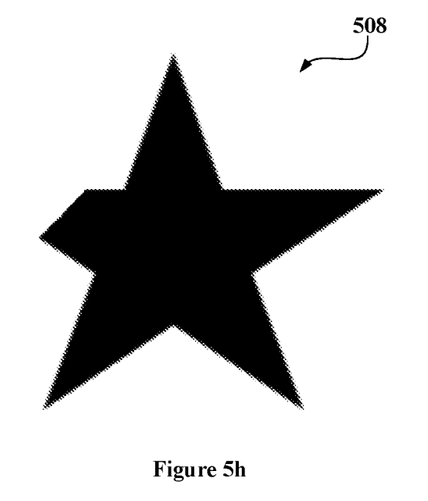

For the post-inspection, the image capturing module 201 may be configured to capture the second image 209 of the laser marked region upon the laser marking. The second image 209 may indicate the markings engraved by the laser marking module 205, on the region 102. Consider the second image 507 to be as illustrated in FIG. 5*g*. The second image 507 may be compared with the predefined image 501 to compute the second score 212. The second score 212 indicates amount of marking present on the laser marked region in relation to the predefined image 501. In an embodiment, the comparing may include to check the amount of the predefined pattern on the laser marked region. By comparing the second image 507 and the predefined image 501, the second score 212 may be computed to be 98%. Consider, another exemplary representation of the second image 508 as illustrated in FIG. 5h. By comparing the second image 508 and the predefined image 501, the second score 212 may be computed to 90%.

The validation module 204 of the laser marking system 101 may validate the laser marking, performed on the region 102, based on the second score 212. The validation comprises determining the laser marking to be one of the valid laser marking and the invalid laser marking. The laser marking system 101 determines the laser marking to be the valid laser marking when the second score 212 is greater than the second predefined threshold value of the configuration file 213. The laser marking system 101 determines the laser marking to be the invalid laser marking when the second score 212 is lesser than a second predefined threshold value. Consider the second predefined threshold value to be 95%. For the second image 507, the second score 212 may be 98% which is greater than the second predefined threshold value. Hence, the laser marking associated with the second image 507 may be determined to be the valid laser marking. For the second image 508, the second score 212 may be 90% which is lesser than the second predefined threshold value. Hence, the laser marking associated with the second image 508 may be determined to be the invalid laser marking.

The second predefined threshold value may be updated based on the reference score 215, upon determining the laser marking to be the valid laser marking. In an embodiment, the reference score 215 is determined using a machine learning technique based on the second score 212 associated with one or more previous laser marked regions associated with valid laser marking. In an embodiment, for every valid laser marking determined by the laser marking system 101, the second score 212 of said valid laser marking may be retrieved. In an embodiment, the reference score 215 may be an average value of the second scores. In another embodiment, the reference score 215 may be a highest value of the second scores. One or more techniques, known to a person skilled in the art may be implemented to determine the reference score 215. In an embodiment, the reference score 215 may be compared with the second predefined. threshold value. The laser marking system 101 may determine the reference score 215 to be one of greater than and lesser than the second predefined threshold value by the comparison. The laser marking system 101 may update the second predefined threshold value based on the comparison. In an embodiment, the second predefined threshold value may be updated with value of the reference score 215 when the reference score 215 is greater than the second predefined threshold value. By this, the accuracy of the laser marking system 101 may be increased.

In an embodiment, the laser marking system 101 may receive data for performing the laser marking through the I/O interface 105 of the laser marking system 101. Also, the laser marking system 101 may transmit data for performing the laser marking via the I/O interface 105. The I/O interface 105 may be coupled with the processor 104 of the laser marking system 101.

The other data 216 may store data, including temporary data and temporary files, generated by modules for performing the various functions of the laser marking system 101. The one or more modules 106 may also include other modules 206 to perform various miscellaneous functionalities of the laser marking system 101. It will be appreciated that such modules may be represented as a single module or a combination of different modules.

Figure 3A:
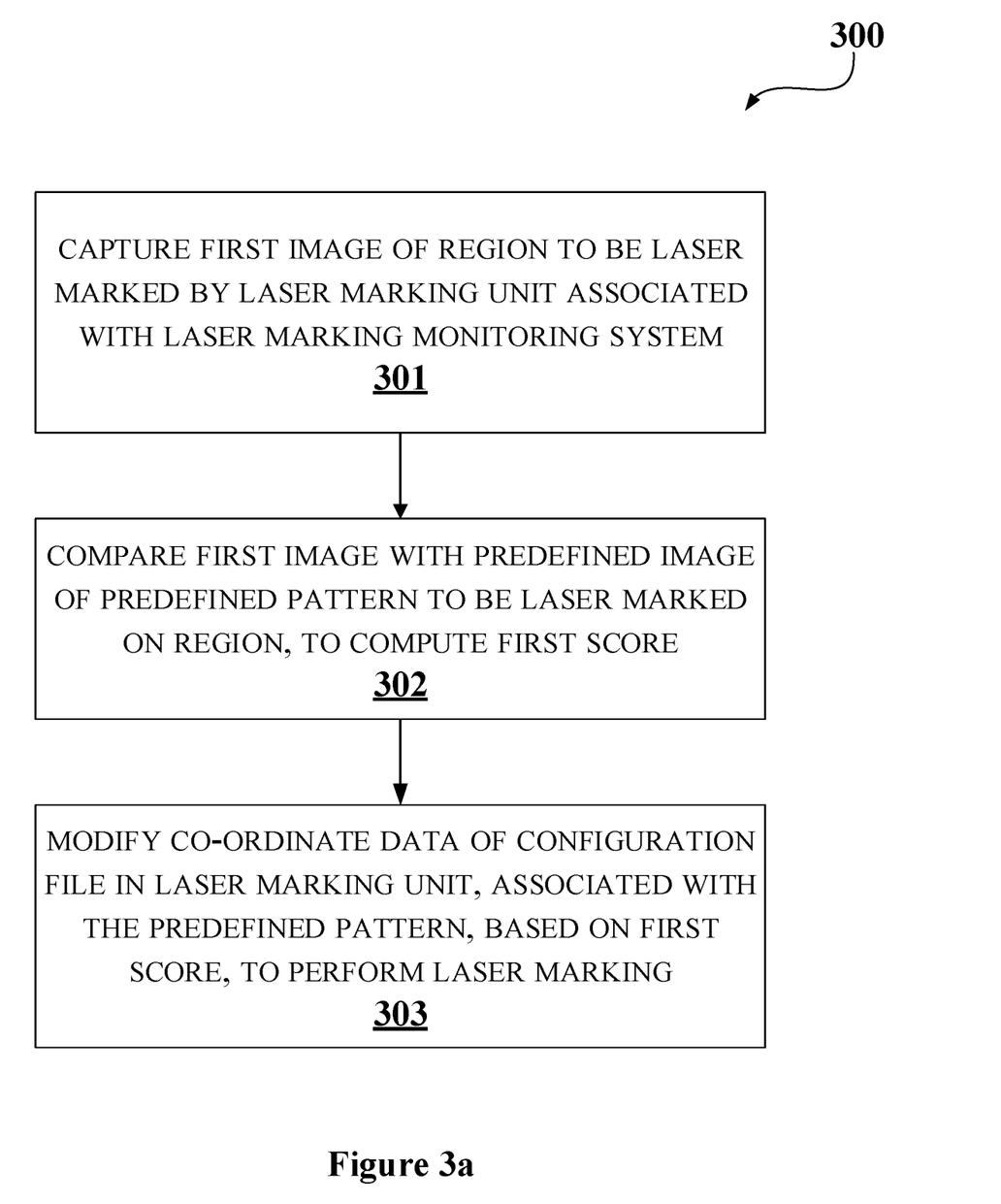
FIG. 3a illustrates a flowchart showing an exemplary method for performing laser marking, in accordance with some embodiments of present disclosure.

FIG. 3a illustrates a flowchart showing an exemplary method for performing laser marking, in accordance with some embodiments of present disclosure.

At block 301, the image capturing module 201 of the laser marking system 101 may capture the first image 208 of the region 102 to be laser marked. In an embodiment, the region 102 may be detected by the image capturing module 201, using one or more techniques, known to a person skilled in the art.

At block 302, the comparing module 202 of the laser marking system 101 compares the first image 208 with the predefined image 210 of the predefined pattern to be laser marked on the region 102, to compute the first score 211. The first score 211 indicates marking already present in the region 102 to be laser marked, in relation to the predefined image 210.

At block 303, the co-ordinate data modification module 203 of the laser marking system 101 modifies the co-ordinate data of the configuration file 213 based on the first score 211. The laser marking module 205 is configured to perform the laser marking on the region 102 based on the modified co-ordinate data.

Figure 3B:
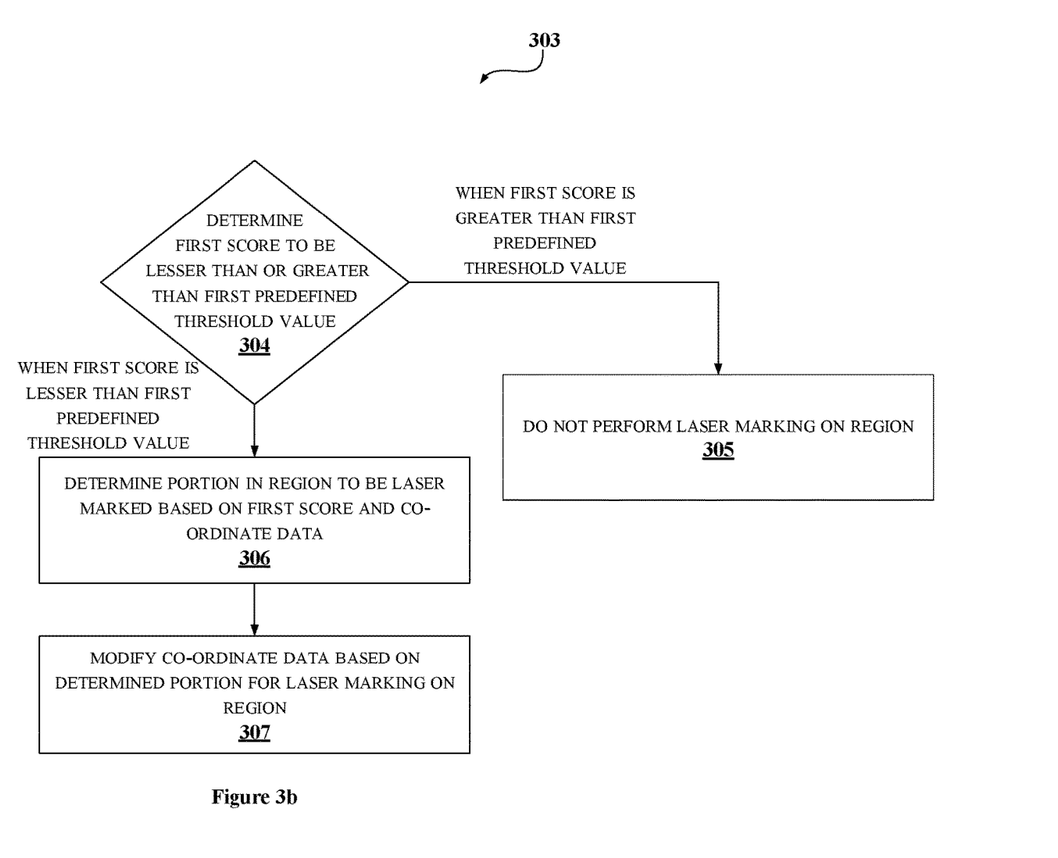
FIG. 3b illustrates a flowchart showing an exemplary method for modifying co-ordinate data by a laser marking system in accordance with some embodiments of present disclosure.

FIG. 3b illustrates a flowchart showing an exemplary method for modifying co-ordinate data by the laser marking system 101 in accordance with some embodiments of present disclosure.

At block 304, the co-ordinate data modification module 203 determines the first score 211 to be one of lesser than and greater than the first predefined threshold value. If the first score 211 is lesser than the first predefined threshold value, step in block 306 is performed. If the first score 211 is greater than the first predefined threshold value, step in block 305 is performed At block 305, when the first score 211 is greater than the first predefined threshold value, the co-ordinate data modification module 203 does not perform the laser marking on the region 102.

At block 306, when the first score 211 is lesser than the first predefined threshold value, the co-ordinate data modification module 203 determines the portion 214 in the region 102 to be laser marked based on the first score 211 and the co-ordinate data.

At block 307, the co-ordinate data modification module 203 modifies co-ordinate data based on the determined portion 214 for laser marking on the region 102. The laser marking module 205 may be configured to perform the laser marking on the region 102 based on the modified co-ordinate data.

Figure 4A:
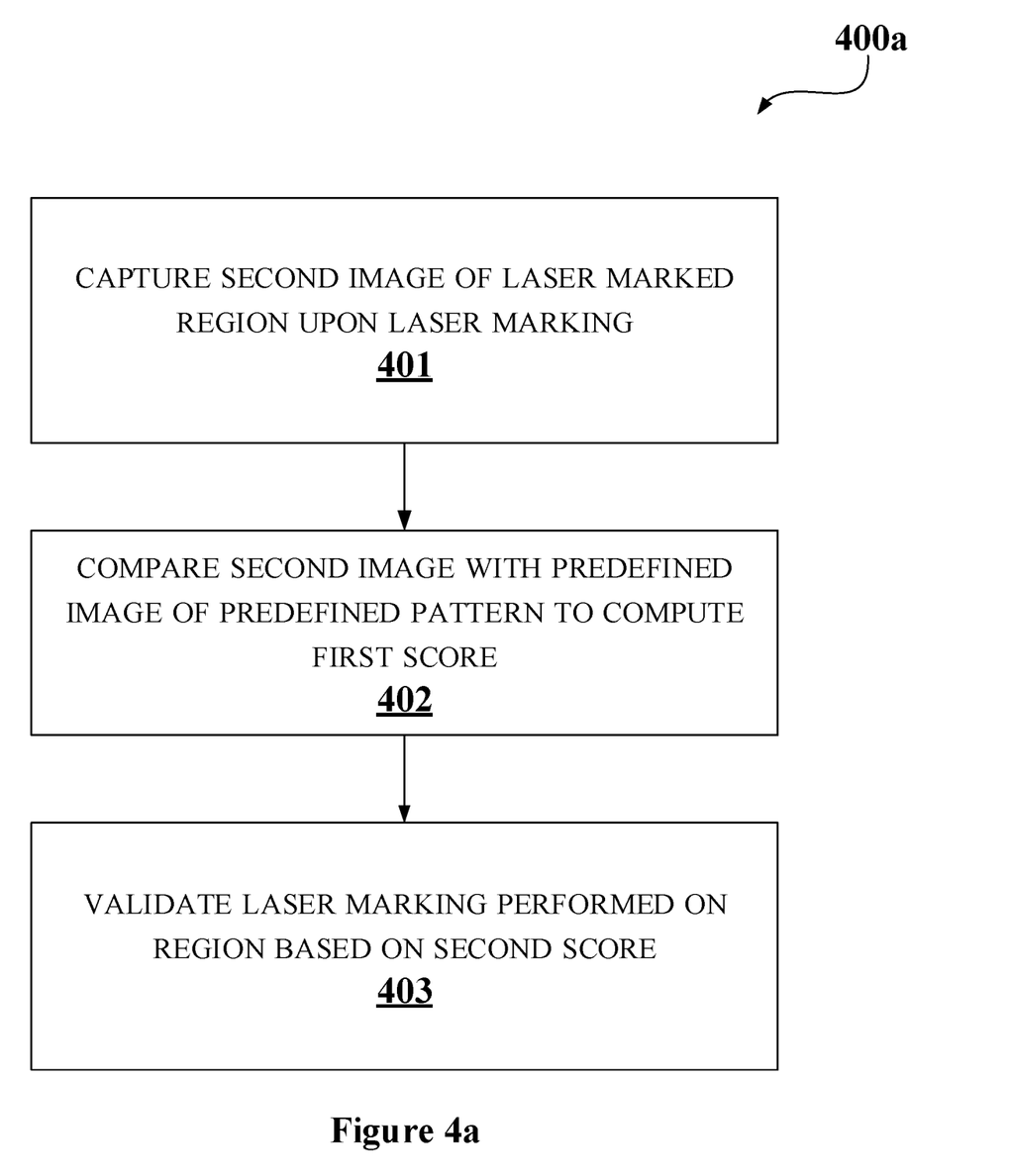
FIG. 4a illustrates a flowchart showing an exemplary method for validating laser marking, in accordance with some embodiments of present disclosure.

FIG. 4a illustrates a flowchart 400a showing an exemplary method for validating the laser marking performed on the region 102, in accordance with some embodiments of present disclosure.

At block 401, the image capturing module 201 of the laser marking monitoring system 101 may capture the second image 209 of the laser marked region upon the laser marking.

At block 402, the comparing module 202 of the laser marking monitoring system 101 compares the second image 209 with the predefined image 210 to compute the second score 212. The second score 212 indicates marking present in the laser marked region, in relation to the predefined image 210.

At block 403, the validation module 204 of the laser marking monitoring system 101 validates the laser marking performed on the region 102, based on the second score 212.

Figure 4B:
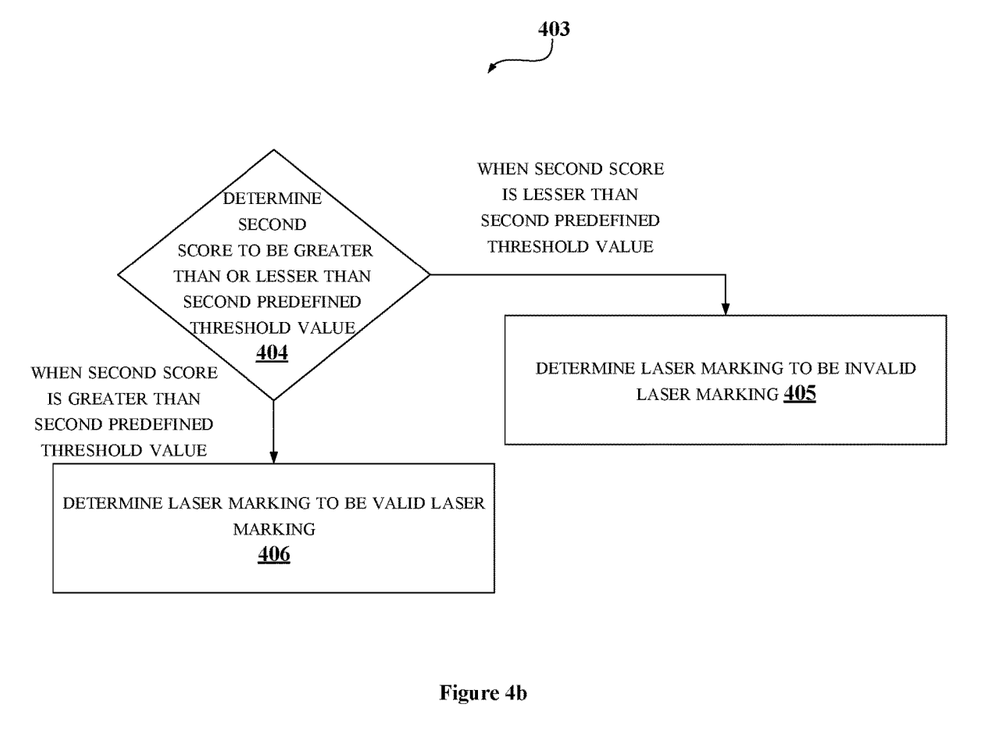
FIG. 4b illustrates a flowchart showing an exemplary method for determining a laser marking to be a valid laser marking in accordance with some embodiments of present disclosure.

FIG. 4b illustrates a flowchart showing an exemplary method for determining one of valid laser marking and invalid laser marking in accordance with some embodiments of present disclosure.

At block 404, the validation module 204 determines the second score 212 to be one of greater than and lesser than the second predefined threshold value. If the second score 212 is greater than the second predefined threshold value, step in block 405 is performed. If the second score 212 is not greater than the second predefined threshold value, step in block 406 is performed.

At block 405, when the second score 212 is lesser than the second predefined threshold value, the laser marking is determined to be invalid laser marking.

At block 406, when the second score 212 is greater than the second predefined threshold value, the laser marking is determined to be valid laser marking.

Figure 4C:
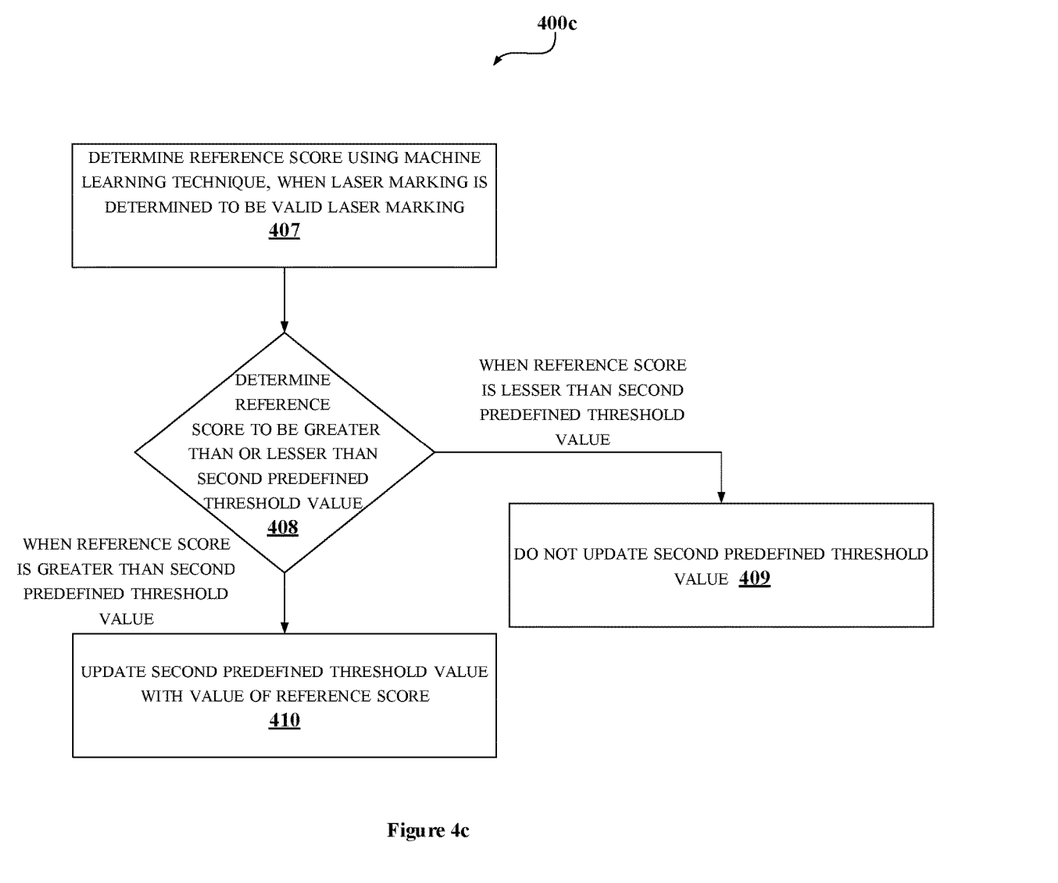
FIG. 4c illustrates a flowchart showing an exemplary method for updating second predefined threshold value in accordance with some embodiments of present disclosure.

FIG. 4c illustrates a flowchart showing an exemplary method for updating second predefined threshold value in accordance with some embodiments of present disclosure;

At block 407, the laser marking system 101 may be configured to determine the reference score 215 using machine learning technique, upon determining the laser marking to be the valid laser marking at the block 407. In an embodiment, the reference score 215 may be based on second score 212 associated with previous laser marked regions associated with valid laser marking. The reference score 215 is compared with the second predefined threshold value.

At block 408, the laser marking system 101 determines the reference score 215 to be one of greater than and lesser than the second predefined threshold value. If the reference score 215 is greater than the second predefined threshold value, step in block 410 is performed. If the second score 215 is lesser than the second predefined threshold value, step in block 409 is performed At block 409, when the second score 212 is not greater than the second predefined threshold value, the second predefined threshold value may not be updated by the laser marking system 101.

At block 410, when the second score 212 is greater than the second predefined threshold value, the second predefined threshold value may be updated with value of the reference score 215.

As illustrated in FIGS. 3a, 3b and 4a-4c, the methods 300, 303, 400a, 403 and 400c may include one or more blocks for executing processes in the laser marking system 101. The methods 300, 303, 400a, 403 and 400c may be described in the general context of computer executable instructions. Generally, computer executable instructions can include routines, programs, objects, components, data structures, procedures, modules, and functions, which perform particular functions or implement particular abstract data types.

The order in which the methods 300, 303, 400a, 403 and 400c are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 6:
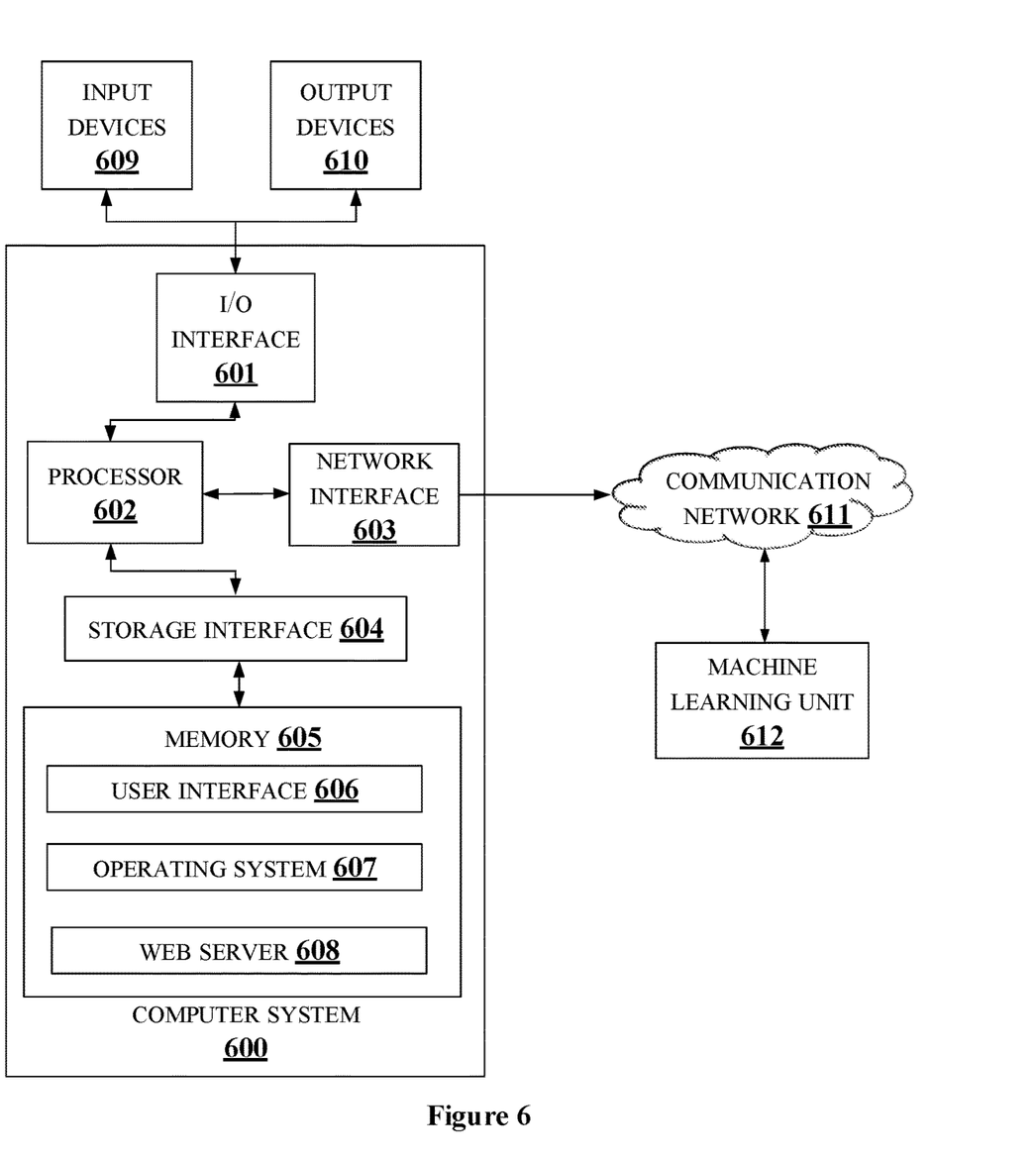
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the laser marking monitoring system 101. The computer system 600 may include a central processing unit ("CPU" or "processor") 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices 609 and 610 via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 may consist of the marking monitoring system 101. The processor 602 may be disposed in communication with the communication network 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with and a machine learning unit 612 for performing the laser marking. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle ® or Sybase®.

The operating system 507 may facilitate resource management and operation of the computer system 700. Examples of operating systems include, without limitation, APPLE MACINTOSH$^R$ OS X, UNIX$^R$, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT WINDOWS™ (XP™, VISTA™/7/8, 10 etc.), APPLE$^R$ IOS™, GOOGLE$^R$ ANDROID™, BLACKBERRY$^R$ OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions both pre-inspection and post inspection of laser marking performed on a material.

An embodiment of the present disclosure provisions to eliminate over marking on a material to be laser marked, by modifying the co-ordinate data. By this, wastage of the material may be avoided.

An embodiment of the present disclosure implements machine learning to learn the performance of laser marking system. One or more thresholds of the laser marking system may be varied based on the learning to increase the accuracy of the system.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a-3b and 4a-4c show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for performing laser marking, comprising:
capturing, by the laser marking system, a first image of a region to be laser marked;
comparing, by the laser marking system, the first image with a predefined image of a predefined pattern to be laser marked on the region, to compute a first score, wherein the first score indicates amount of marking present on the region to be laser marked, in relation to the predefined image; and
modifying, by the laser marking system, a co-ordinate data of a configuration file, relating to the predefined pattern, in the laser marking system based on a portion of the region identified by comparing the first score with a first predefined threshold value of the configuration file and determining the portion to be laser marked based on the first score and the coordinate data, upon determining the first score to be lesser than the first predefined threshold value, for performing the laser marking on the region.

2. The method as claimed in claim 1, further comprising:
capturing, by the laser marking system, a second image of a laser marked region upon the laser marking;
comparing, by the laser marking system, the second image with the predefined image to compute a second score, wherein the second score indicates marking present in the laser marked region, in relation to the predefined image; and
validating, by the laser marking system, the laser marking performed on the region based on the second score.

3. The method as claimed in claim 2, wherein the validation comprises determining the laser marking to be a valid laser marking when the second score is greater than a second predefined threshold value of the configuration file and determining the validation to be an invalid laser marking when the second score is lesser than the second predefined threshold value.

4. The method as claimed in claim 3, wherein upon determining the laser marking to be the valid laser marking, the second predefined threshold value is updated based on a reference score.

5. The method as claimed in claim 4, wherein the reference score is determined using a machine learning technique based on second score associated with one or more previous laser marked regions associated with valid laser marking.

6. A laser marking system for laser marking, comprises:
a processor; and
a memory communicatively coupled to the processor, wherein the memory stores processor-executable instructions, which, on execution, cause the processor to:
capture a first image of a region to be laser marked;
compare the first image with a predefined image of a predefined pattern to be laser marked on the region, to compute a first score, wherein the first score indicates amount of marking present on the region to be laser marked, in relation to the predefined image; and
modify a co-ordinate data of a configuration file, relating to the predefined pattern, in the laser marking system based on a portion of the region identified by comparing the first score with a first predefined threshold value of the configuration file and determining the portion to be laser marked based on the first score and the co-ordinate data, upon determining the first score to be lesser than the first predefined threshold value, for performing the laser marking on the region.

7. The method as claimed in claim 6, further comprises the processor configured to:
capture a second image of a laser marked region upon the laser marking;
compare the second image with the predefined image to compute a second score, wherein the second score indicates marking present in the laser marked region, in relation to the predefined image; and
validate the laser marking performed on the region based on the second score.

8. The laser marking system as claimed in claim 7, wherein the validation comprises determining the laser marking to be a valid laser marking when the second score is greater than a second predefined threshold value of the configuration file and determining the validation to be an invalid laser marking when the second score is lesser than the second predefined threshold value.

9. The laser marking system as claimed in claim 8, wherein upon determining the laser marking to be the valid laser marking, the second predefined threshold value is updated based on a reference score.

10. The laser marking system as claimed in claim 9, wherein the reference score is determined using a machine learning technique based on second score associated with one or more previous laser marked regions associated with valid laser marking.

11. A non-transitory computer-readable storage medium having stored thereon, a set of computer-executable instructions for causing a computer comprising one or more processors to perform steps comprising:

capturing, by the laser marking system, a first image of a region to be laser marked;

comparing, by the laser marking system, the first image with a predefined image of a predefined pattern to be laser marked on the region, to compute a first score, wherein the first score indicates amount of marking present on the region to be laser marked, in relation to the predefined image; and modifying, by the laser marking system, a co-ordinate data of a configuration file, relating to the predefined pattern, in the laser marking system based on a portion of the region identified by comparing the first score with a first predefined threshold value of the configuration file and determining the portion to be laser marked based on the first score and the co- ordinate data, upon determining the first score to be lesser than the first predefined threshold value, for performing the laser marking on the region.

* * * * *